US009058815B2

(12) United States Patent
Pratt et al.

(10) Patent No.: US 9,058,815 B2
(45) Date of Patent: Jun. 16, 2015

(54) SYSTEM, APPARATUS, AND METHOD FOR INTERFACING WORKFLOW INSTRUCTIONS

(71) Applicant: General Electric Company, Schenectady, NY (US)

(72) Inventors: Gary Lawrence Pratt, Delafield, WI (US); Judy Ann Johnston, Flowery Branch, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 316 days.

(21) Appl. No.: 13/690,499

(22) Filed: Nov. 30, 2012

(65) Prior Publication Data
US 2014/0152816 A1   Jun. 5, 2014

(51) Int. Cl.
*H04N 7/18* (2006.01)
*G10L 15/26* (2006.01)
*G10L 13/08* (2013.01)

(52) U.S. Cl.
CPC ............. *G10L 15/26* (2013.01); *G10L 13/08* (2013.01)

(58) Field of Classification Search
CPC ....... G10L 15/265; G10L 15/26; G10L 13/00; H04R 3/00; H04N 7/18
USPC .......... 348/143, 147, 135; 704/200, 233, 270, 704/270.1, 275
See application file for complete search history.

(56) References Cited

U.S. PATENT DOCUMENTS

| 6,314,401 | B1 | 11/2001 | Abbe et al. | |
| 7,698,131 | B2 | 4/2010 | Bennett | |
| 2009/0187072 | A1* | 7/2009 | Manohara et al. | 600/109 |
| 2011/0293144 | A1* | 12/2011 | Rahardja et al. | 382/103 |

FOREIGN PATENT DOCUMENTS

| CN | 2750599 Y | 1/2006 |
| DE | 10057326 A1 | 10/2002 |
| DE | 20315385 U1 | 6/2004 |
| JP | 2003076389 A | 3/2003 |
| WO | WO2006031752 A2 | 3/2006 |

OTHER PUBLICATIONS

Evans, et al., Achieving a hands-free computer interface using voice recognition and speech synthesis, pp. 14-16. vol. 15 Issue:1, ISSN : 0885-8985, Issue Date: Jan. 2000. Aerospace and Electronic Systems Magazine, IEEE.

* cited by examiner

*Primary Examiner* — Robert Chevalier
(74) *Attorney, Agent, or Firm* — GE Global Patent Operation; Mark A. Conklin

(57) ABSTRACT

A system, method, and apparatus for interfacing an operating management system with an operator is provided. The system provides a processor configured to execute workflow instructions; and an operator device in communication with the processor. The processor is configured to execute commands which convert the workflow instructions from a text command into an audible command and transmit the audible command to the operator device and the operator device is configured to receive the audible command, and is further configured to transmit an operator response to the processor.

11 Claims, 4 Drawing Sheets

FIG. 4

SYSTEM, APPARATUS, AND METHOD FOR INTERFACING WORKFLOW INSTRUCTIONS

BACKGROUND OF THE INVENTION

1. Field of the Invention

The field of the invention relates generally to industrial control systems. More particularly, the invention relates to certain new and useful advances for interfacing workflow instructions in an industrial or manufacturing setting.

2. Description of Related Art

A complex industrial system line requires an organized hierarchy of systems, particularly in regard to advanced products, for example, magnetic resonance imaging systems and gas turbines.

Manufacturing many of these advanced products takes a vast amount of skill and technique from Operators in many different disciplines. Logistically, improvements have been made over the better part of the last few decades to mitigate the myriad of errors that can occur with such a large undertaking. For example, during manufacturing of an advanced product, Operators must follow strict procedural guidelines to maintain the integrity of the products. For this reason, manufacturers put into place workflow-instruction technology, which assists in digitizing procedures in the workflow. Workflow software prompts operators and guides them through them through standard operating procedures (SOPs), verifying their compliance, prompting for data input for quality and process data, while also checking for errors.

An example of workflow software includes Proficy Workflow® by GE Intelligent Platforms, which provides a system that enables manufactures to digitize manual and automated processes such as capturing process, traceability and quality data across systems to reduce errors, waste and delays.

In a traditional system, an operator may be proximate the product to which a workflow process is applicable. When the product reaches the operator, the SOPs, which reside on a workflow terminal via the software discussed above, prompt the operator with a set of specific instructions. The operator, upon receipt of said instruction, then physically moves to the product and performs the given operation or procedure according to the SOP. The operator then must move back to the workflow terminal and confirm the instructions were followed, at which time a new or subsequent SOP, in a series of SOPs may be given. This process can continue unabated, and with each set of instructions of the series of instructions, the operator must move from the product to the workflow terminal, back to the product and back to the monitor. Further, the operator may input certain quality control indicia together with certain data for storage.

The requirement of the operator to move from the product to receive SOPs while also verifying SOPs is cumbersome and inefficient, at best. It further increases the probability of injury and mistake.

Accordingly, to date, no suitable interface for operator management of a workflow system exists.

BRIEF SUMMARY OF THE INVENTION

The present disclosure describes a system and method for interfacing an operating management system with an operator.

The system comprises a processor configured to execute workflow instructions; and an operator device in communication with the processor; wherein the processor is further configured to execute commands which convert the workflow instructions from a text command into an audible command and transmit the voice command to the operator device; and wherein the operator device is configured to receive said audible commands, and further configured to transmit an operator response to the processor.

Also, a method for interfacing a workflow management system with an operator, the method executable by a processor, the method comprising executing workflow instructions using the processor; audibly transmitting the workflow commands to the operator audibly; receiving the audible workflow commands at the operator device; transmitting an operator response to the processor; and converting the operator response to text.

An operator device for interfacing an operating management system with an operator, is provided having a processor configured to execute workflow instructions; and an acoustic transducer in communication with the processor; wherein the processor is further configured to execute commands which convert the workflow instructions from a text command into an audible command and transmit the audible command to the operator; and wherein acoustic transducer is configured to receive an audible operator response and transmit the operator response to the processor for conversion to text.

Benefits over and difference from prior approaches is increased efficiency and effectiveness of the manufacturing process, particularly in situations involving a large number of steps and/or a complex manufactured product. The present invention significantly increases operator efficiency and reduce customer labor costs.

BRIEF DESCRIPTION OF THE DRAWINGS

Other features and advantages of the disclosure will become apparent by reference to the accompanying drawings, in which:

FIG. 4 is a screen shot of a graphical user interface in accordance with an embodiment of the present invention.

Like reference characters designate identical or corresponding components and units throughout the several views, which are not to scale unless otherwise indicated.

DETAILED DESCRIPTION

Embodiments of the present invention describe a system, apparatus and method for a workflow interface.

Embodiments of the present invention integrate voice and speech recognition software into a workflow interface in, for example, a shop-floor manufacturing process. The present invention provides increases efficiency and effectiveness of the manufacturing process, particularly in situations involving a large number of steps and/or a complex manufactured product. The present invention significantly increases operator efficiency and reduce customer labor costs.

In an exemplary embodiment of the present invention, the system may comprise a central processing unit (CPU) comprising software configured to convert text workflow instruction to audible workflow instructions, and transmit said audible instruction to an operator device. The operator device may be configured to receive the audible workflow instructions or commands, while giving the operator the ability to respond to said commands. The response, which may be a vocal response, may then be transmitted back to the CPU, where the response is converted from a voice response to a text response for assessment, logging and storage.

The central processing unit has a processor configured to execute programmable instructions, which when executed causes the processor to send and receive workflow instructions and operator response, each of which will be discussed in greater detail below with reference to the Figures.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to industrial plants, a skilled artisan will recognize that embodiments of the invention can be implemented in other similar fields.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
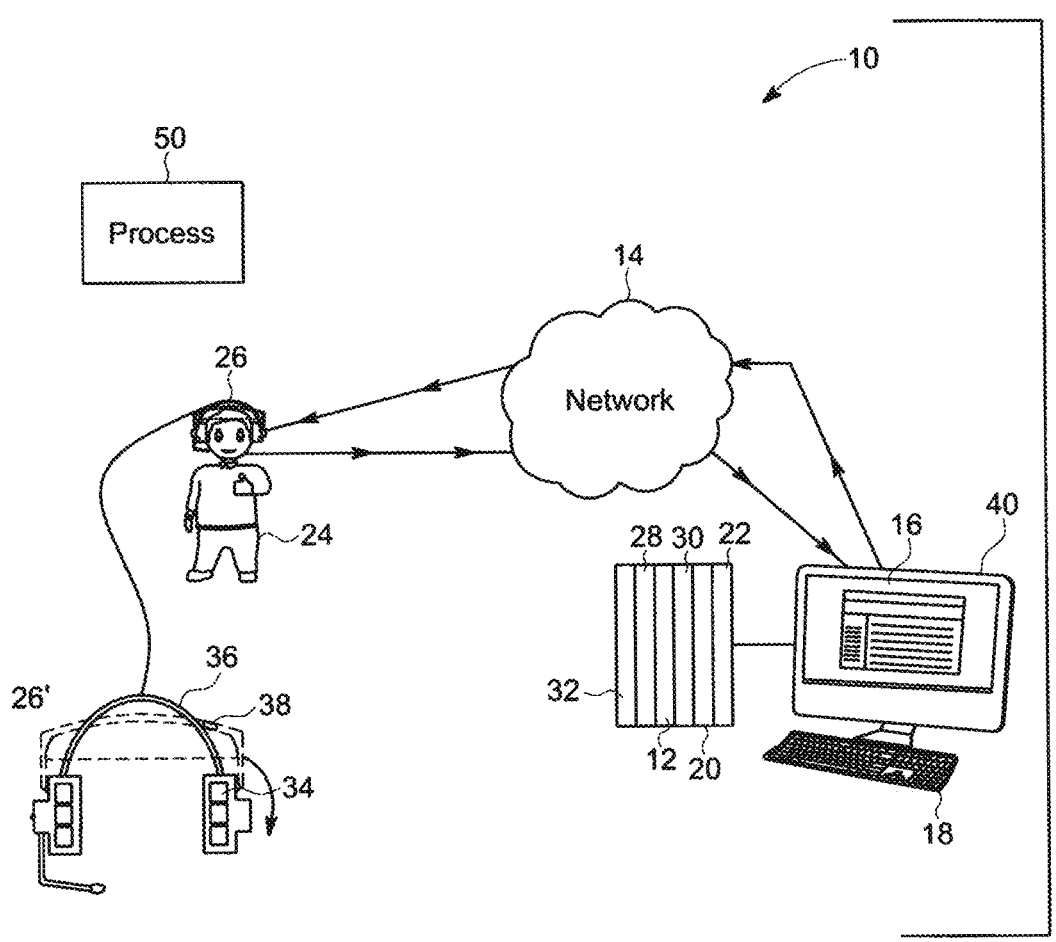
FIG. 1 is a schematic diagram of an exemplary industrial control system in accordance with an embodiment of the present invention.

With reference now to FIG. 1, a block diagram of an exemplary system 10 for use with the present invention is shown generally. In this exemplary embodiment, CPU 12 (also referred to herein as "processor") is coupled to a network 14. The network 14 may be supported by Ethernet, for example. The CPU 12 may be further coupled to graphical user interface 16 (or, optionally, a monitor 40 and keyboard 18). The CPU 12 may include multiple I/O, which correspond to a variety of functions. The system processors, or CPU 12 may further include microprocessors, random-access memory ("RAM") 20 and read-only memory ("ROM") 22, and may be used to provide the connections and adapt signals into a usable form. In various embodiments of the present invention, the CPU 12 is loaded with software that is resident in the computer memory, the software comprising preloaded drivers configured to support text to speech and voice to speech interactions.

Text to speech (TTS) conversion software 30 may be loaded into to the memory of the CPU 12 and comprise a TTS system that converts nolinal language text into speech, or render symbolic linguistic representations like phonetic transcriptions into speech. The TTS software 30 may be provided as a program which provides large output range, or may utilize a synthesizer that incorporates vocal tracts and other human voice characteristics. The TTS software 30 may comprise generalized purpose TTS software, or may be specifically configured for the manufacturing workflow software it is designed to support. In an optional embodiment of the present invention, the TTS conversion software 30 may be disposed with the operator device 26, and undergo the conversion at the operator device. In this embodiment, less bandwidth for transmission is required.

In an exemplary embodiment, the TTS software 30 may be configured with a predetermined set of voice commands that correspond exactly and directly to the workflow instruction, further increasing reliability and consistency. The TTS may operate with a combination of the software together with computer hardware. The software may be responsible for outputting a readable file (e.g. wav. file) which is transferred to a sound card, which comprises a circuit that performs the function. The sound card is configured to convert .wav file to analog electrical signals, which are then output to an operator 24, for example, at an operator device 26 such that the operator 24 may listen to the workflow message from the workflow software 28. In optional embodiment of the present invention, the operator ay depress a switch on the operator device 26 to either reply to workflow instruction, replay the workflow instructions, or pause the workflow instructions, each which will be discussed in greater detail with relation to FIG. 2.

Speech to text conversion software (STT) 32 may, together with the TTS 30 software, may be loaded into the memory of the CPU 12. The STT 32, or Speech Recognition Software, is configured to convert the operator's speech into a text or symbolic format, which may be stored in the CPU 12 memory. In an exemplary embodiment of the present invention, the STT software 32 may be based on, for example, Hidden Markov Models, as is known in the art. In other exemplary embodiments, various combinations of a number of techniques for improved results. For example, the software may use vocal tract length nomialization (VTLN), for male-female normalization and maximum likelihood linear regression (MLLR) for more general speaker adaptation. In an optional embodiment of the present invention, the STT conversion software 32 may be disposed with the operator device 26, and undergo the conversion at the operator device. In this embodiment, less bandwidth for transmission is required.

The CPU 12 may be further loaded with manufacturing workflow software 28. In an exemplary embodiment, the workflow software comprises instructions for the automation of a process 50. Typically, and in an exemplary embodiment of the present invention, the process comprises movement of product from one operator to another for a certain action, according to a set of rules or SOPs. The workflow software 28 provides a system for digitizing a production flowchart across a web of operators, for example, through network 14. The workflow software 28 may further include digitizing the flowchart for automated tasks. Some examples of workflow instructions, which may reside on the GUI 16, include tasks for operator such as checking tank levels every hour, managing an entire production process, orchestrating data transfolinations, and installing components of a complex machine (e.g., magnetic resonance imaging system, turbine, etc.). In optional embodiments of the present invention, workflow instructions may be designed to play previously recorded audible work instructions (without the need for a processor). In another optional embodiment, the system is configured to record the operator's actual verbal response for later authentication.

In an exemplary embodiment, the operators follow SOPs and work instructions through the industrial workflow. The manufacturing software 28 electronically guides operators through step-by-step instructions, using the TTS 32 software and audible communication the operator device 26, which will be discussed in greater detail with respect to FIG. 2.

Referring still to FIG. 1, with reference to $26^1$ an enlarged view of the operator device is shown. The operator device may comprise, in an exemplary embodiment, a headset to be worn by the operator 24. The headset 26 may be communicatively coupled to the CPU 12 via network 20. The headset 26 may comprise those features of headset generally known in the art such as speakers, digital wireless radio frequency carrier reception, Bluetooth with Bluetooth-pairing modes, a microphone, amplifier, digital signal processor, USB port and the like.

In exemplary embodiments of the present invention, the headset 26 is communicatively coupled to the CPU 12 through, for example, the network 14. However, other modes of communication, which are not limited herein, include Bluetooth, Wireless LAN, WiFi, UWB, wireless USB, infrared, and the like. Of course, while in exemplary embodiments of the present invention wireless communication is discussed, direct connection via hard wire is applicable in the present invention as well.

The headset 26 may further comprise operator touch or voice controls 34, which may include buttons, switches, toggles, touch screens voice command receptors and the like. In optional embodiments of the present invention, the headset 26 may further comprise a monocular, semi-transparent, or wearable retina image display (RID) eye-glass monitor 36 configured in some cases to move downwards towards the operators eyes and to provide the operator 24 with visual work instructions or supplemental visual information. In another optional embodiment the monitor 36 may be fitted with a camera 38 to allow images of workflow steps to be photographed for archive and storage purposes at the CPU 14. In addition, the camera 38 may be used to read barcode information or to read digital displays on instruments which do not have electronic interfaces.

Figure 2:
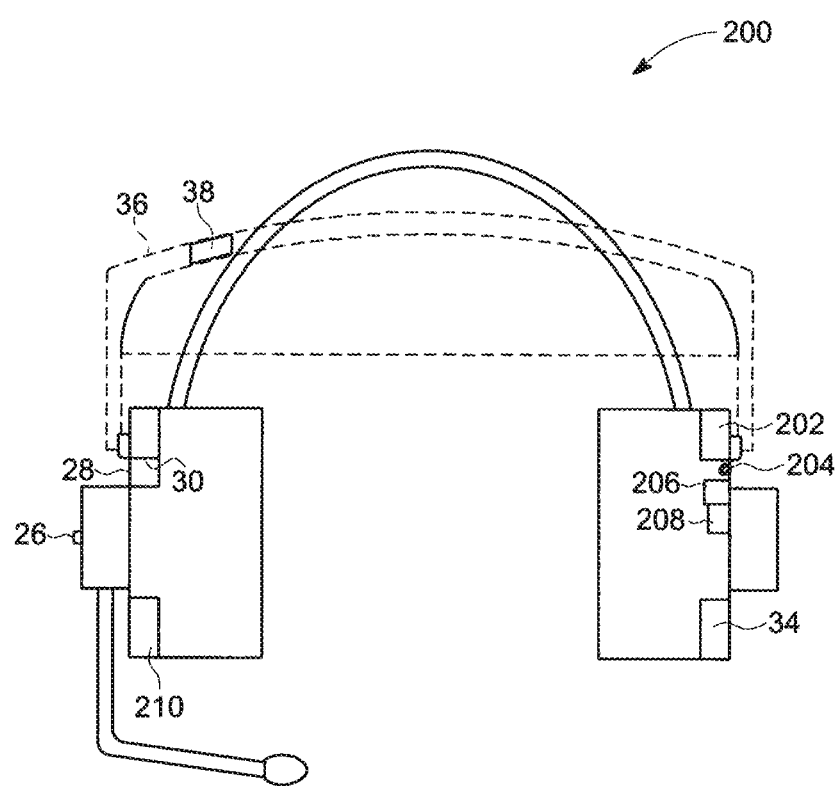
FIG. 2 is a schematic block diagram of a user device in accordance with an embodiment of the present invention.

Referring now to FIG. 2, an operator device in accordance with another embodiment of the present inventions is shown generally at 200. The operator device 200, in an exemplary embodiment, is a headset to be worn by an operator. The headset, as in FIG. 1, may be communicatively coupled to a CPU via a network. The headset 200 may comprise those features of headset generally known in the art such as speakers, digital wireless radio frequency carrier reception, Bluetooth with Bluetooth-pairing modes, a microphone, amplifier, digital signal processor, USB port and the like.

In this exemplary embodiment, the headset may comprise a processor 202, multiple I/Os 204, which correspond to a variety of functions. The system processor 202 may further include microprocessors, random-access memory ("RAM") 206 and read-only memory ("ROM") 208, and may be used to provide the connections and adapt signals into a usable form. In various embodiments of the present invention, the processor via memory 206, 208 is loaded with software that is resident in the computer memory, the software comprising preloaded software drivers configured to support text to speech and voice to speech interactions and to transmit information over a network to a database server.

The headset 200 may further comprise operator touch or voice controls 34, which may include buttons, switches, toggles, touch screens voice command receptors and the like. In optional embodiments of the present invention, the headset 26 may further comprise a monocular, semi-transparent, or wearable retina image display (RID) eyeglass monitor 36 configured in some cases to move downwards towards the operators eyes and to provide the operator 24 with visual work instructions or supplemental visual information. In another optional embodiment the monitor 36 may be fitted with a camera 38 to allow images of workflow steps to be photographed for archive and storage purposes at the CPU 14. In addition, the camera 38 may be used to read barcode information or to read digital displays on instruments which do not have electronic interfaces.

The headset 200 may further comprise text to speech (TTS) conversion software 30 may be loaded into to the memory of the CPU 12 and comprise a TTS system that converts normal language text into speech, or render symbolic linguistic representations like phonetic transcriptions into speech directly at the operator device 200

In optional embodiment of the present invention, the operator may depress a switch on the operator device 26 to either reply to workflow instruction, replay the workflow instructions, or pause the workflow instructions.

Speech to text conversion software (STT) 32 may, together with the TTS 30 software, may be loaded into the memory of the processor 202. The STT 32 is configured to convert the operator's speech into a text or symbolic format, which may be stored in the processor 202 memory directly on the user device 200.

The user device 200 may be further loaded with manufacturing workflow software 28. In an exemplary embodiment, the workflow software comprises instructions for the automation of a process. In an exemplary embodiment of the present invention, the process comprises movement of product from one operator to another for a certain action, according to a set of rules or SOPs. The workflow software provides a system for digitizing a production flowchart across a web of operators, for example, through network.

The user device 200 may further comprise an communication hardware/software for sending signals over a network to a database.

Figure 3:
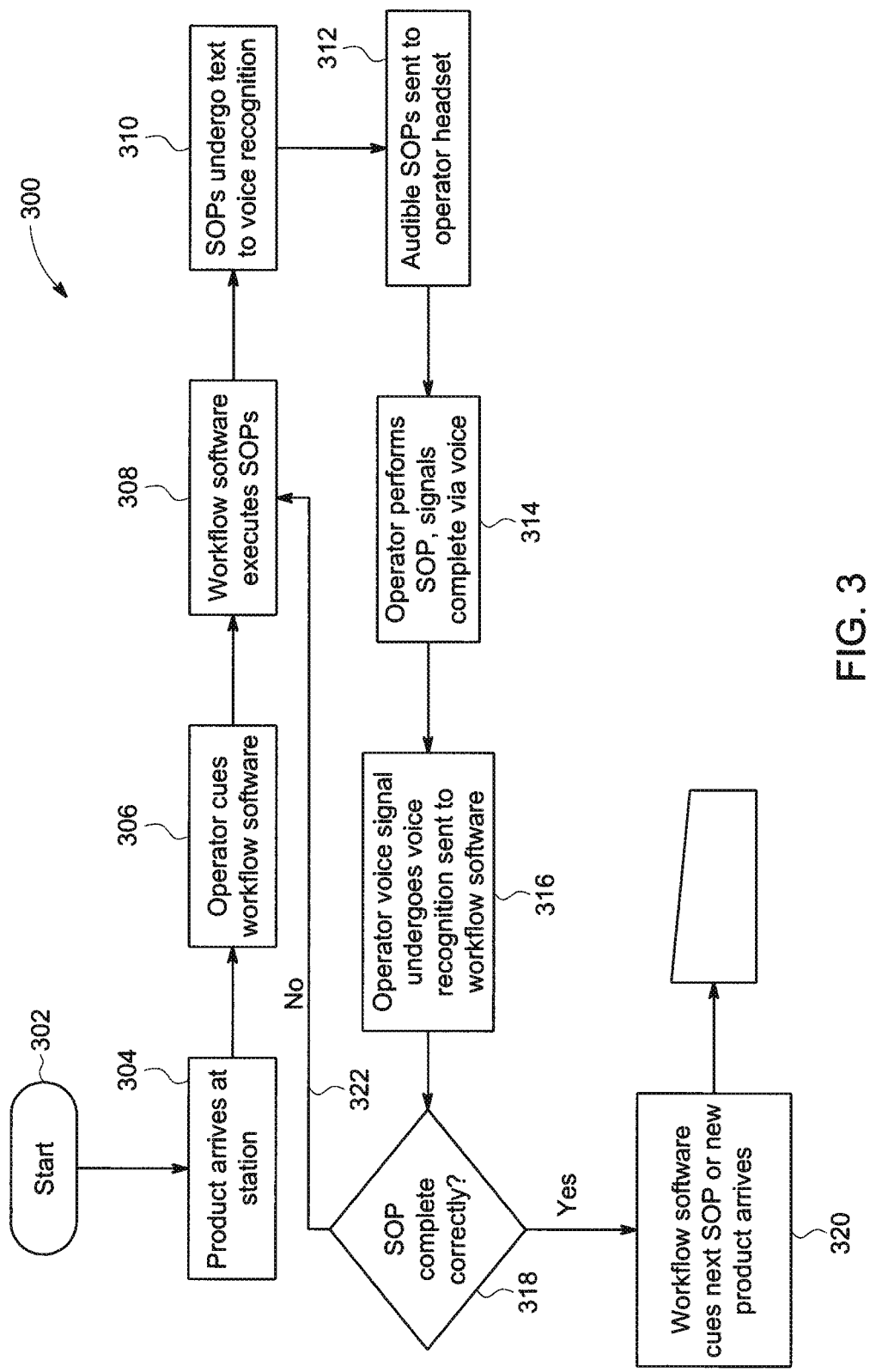
FIG. 3 is stepwise block diagram in accordance with an embodiment of the present invention.

Referring now to FIG. 3, a flow-chart to better help illustrate a method interfacing a workflow application of an industrial system is shown generally at reference numeral 300. While the flowchart shows an exemplary step-by-step method, it is to be appreciated that a skilled artisan may rearrange or reorder the steps while maintaining like results.

While in the exemplary embodiment, the manufacturing workflow software 28 is related to a manual diesel generator tests (i.e. process 50). However, a skilled artisan will understand that the method is applicable to other industries, manufacturing plants and controlled process plants. In this embodiment, a manual diesel generator test which consists of one or more task steps or SOPs, which are listed in order that they are to be performed by the operator. An exemplary GUI 16 applicable to the test is shown generally at FIG. 4 for a manual generator task 402. For example, as will be discussed in relation this method, an operator will be queued to "Check Generator Oil Level" 402, "Check Cooling System Level" 404 and so on.

At step 302, the start step, an operator may put on his or her operator device 26. The system is configured, at this step, to verify the operator's identity. To do so, the operator device 26 may be configured to prompt the operator to speak a certain lexicon, which will be read and matched by the processor to the operator's stored voice. If approved, the operator will be allowed to participate in the workflow, and requires the SOPs. In this regard, the same voice pattern verification software may be used to verify that the operator logged into the workstation is same operator who is completing the step. Optionally, the voice recognition software may translate and make text records of other required feedback from the operator such as test results, serial numbers and the like.

In an optional embodiment of the present invention, as step 302, the operator 24 may request, via a soft-key or dedicated key disposed on the operating device, that the workflow program begin. The soft-key, for example, may include activation of a certain combination of buttons, or similar combinations of existing keys. The dedicated key, for example, can include activation of a special function key.

At step 304, the product may arrive at the work station, or in this exemplary embodiment, a trigger even may occur. The trigger event may be a power outage, or any other event that requires action on the part of an operator.

Figure 4:
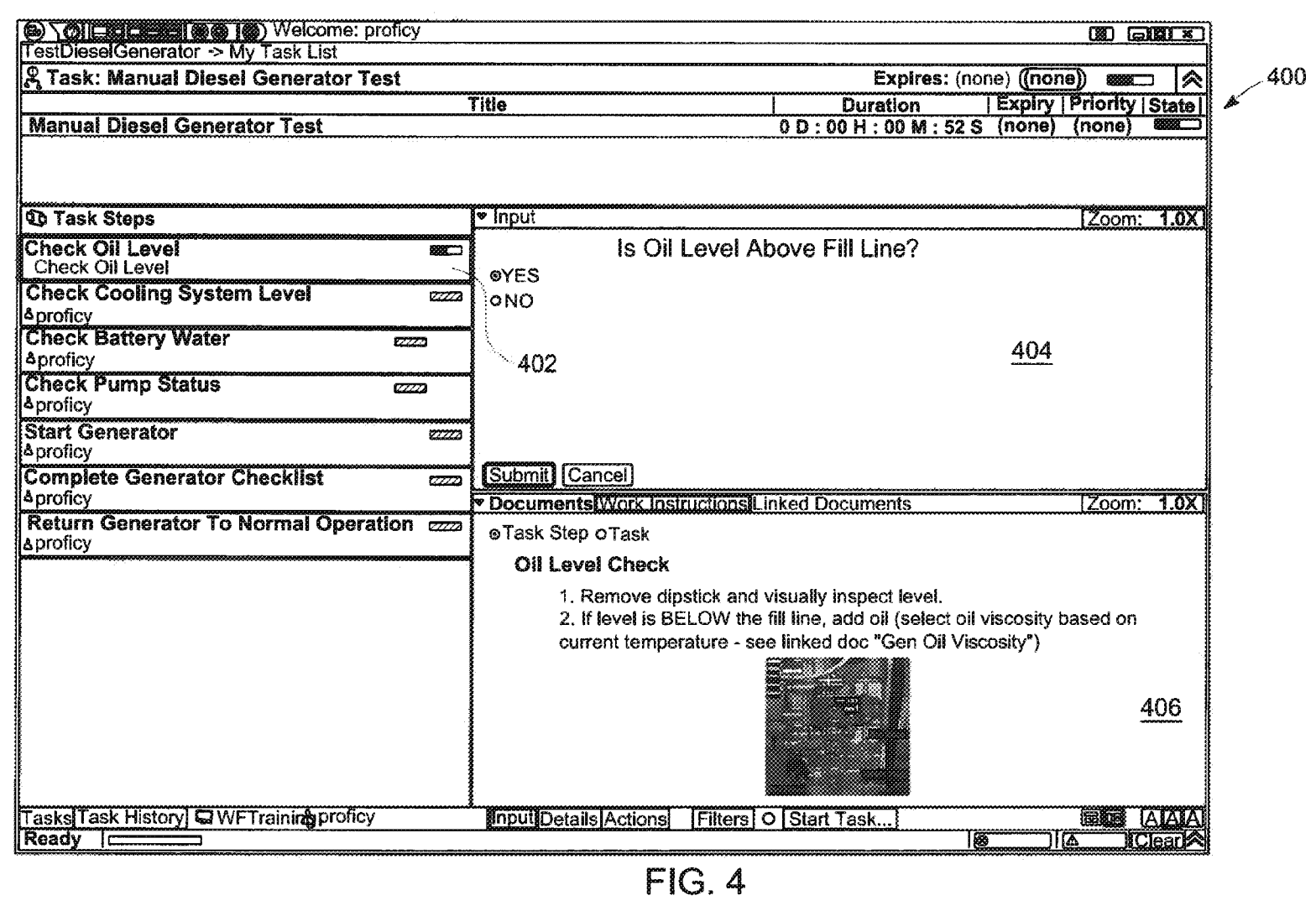

At step 306, the operator 24, via operator device 26, may queue the workflow instructions. To queue the instructions, the operator 24 may tap his or her operator device 26, or speak a command word into the device 24 microphone that is configured to execute the workflow software to begin to review the SOPs, step 208. In this exemplary embodiment, and as can be seen in FIG. 4, the SOP reads CHECK OIL LEVEL.

At step 310, the SOPs undergo text to speech recognition. The TTS conversion software 30, which is loaded into to the memory of the CPU 12 converts normal language text into speech, or render symbolic linguistic representations like phonetic transcriptions into speech.

Next, at step 312, the audible SOPs are sent to the operator device 26, where the operator device transmits the SOPs to the operator 24. In this exemplary embodiment, an audible command of CHECK OIL LEVEL 402 is transmitted to the operator. The SOP may further include the command IS OIL LEVEL ABOVE FILL LINE 404. Also, more instructions may be presented such as those shown at 304 title OIL LEVEL CHECK. The workflow can be given to the operator in stepwise instruction, for example, REMOVE DIPSTICK AND INSPECT LEVEL, followed by a complete/incomplete inquiry, then STEP 2.

At step 314, the operator performs the SOP, and signals, via the operator device 26, that the SOP has been completed. In this exemplary embodiment, the operator will audibly answer YES or NO. In optional embodiments of the present invention, the system may be configured to accept any audible response and take an action based on said response.

Next, at step 316, the operator response, or voice signal (YES/NO) is configured to undergo speech to text conversion using the STT software that is loaded into the memory of the CPU 12. The STT 32 is configured to convert the operator's speech into a text or symbolic format, which may be stored in the CPU 14 memory.

At step 318, the system is configured to establish whether the operator performed the SOP correctly. In this exemplary embodiment, the diesel generator may be provided with sensors to check the quality of the response. In other embodiments, other inspection technologies may be used, such as object recognition and the like.

If the operator has followed the step and performed sufficiently, the workflow software will cue the next SOP, step 320. If the system finds that the SOP was not performed sufficiently, the workflow software will re-queue the SOP for recognition, step 308.

Thereafter, the method restarts at step 306 on predetermined basis, and progresses through the SOPs until the entire workflow is finished.

In optional embodiments of the present invention, the system, through the CPU 12 may, using the STT software, convert the captured audio to a text memo to be stored on the CPU 12, server, or any known data storage device, as part of the workflow records.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The construction and arrangement of the elements described herein are illustrative only. Although only a few embodiments have been described in detail in this disclosure, those of ordinary skill who review this disclosure will readily appreciate that many modifications are possible without materially departing from the novel teachings and advantages of the subject matter recited in the claims.

Accordingly, all such modifications are intended to be included within the scope of the methods and systems described herein.

The order or sequence of any process or method steps may be varied or re-sequenced according to alternative embodiments. Other substitutions, modifications, changes and omissions may be made in the design, operating conditions and arrangement of the embodiments without departing from the spirit and scope of the methods and systems described herein.

What is claimed is:

1. A system for interfacing an operating management system with an operator, the system comprising:
a processor configured to execute workflow instructions; and
an operator device in communication with the processor, the operator device being a headset comprising a microphone, a camera, and a wireless receiver for communicative coupling with the processor;
wherein the processor is further configured to execute commands which convert the workflow instructions from a text command into an audible command and transmit the audible command to the operator device;
wherein the operator device is configured to receive the audible command via the microphone, and is further configured to transmit an operator response to the processor via the wireless receiver either directly or through the network; and
wherein the camera is configured to capture images of at least a workflow step, and configured to send the images to the processor for archiving.

2. The system of claim 1, further comprising a network in communication with the processor and the operator device, wherein the network is configured to transfer the audible workflow instructions from the processor to the operator device in real-time.

3. The system of claim 1, wherein the processor is disposed in a computer processing unit, the computer processing unit comprising:
random access memory and read only memory having preloaded software, wherein the preloaded software comprises:
text to speech software;
speech to text software; and
manufacturing workflow software.

4. The system of claim 1, wherein the workflow software comprises the workflow instruction, and wherein the workflow instructions comprise a series of consecutive workflow instructions transmittable by the processor in series.

5. The system of claim 1, wherein the processor is further configured to, between each of the series of workflow instructions, await a response from the operator device, and if received, transmit a next workflow instruction in the series of workflow instructions.

6. The system of claim 1, further comprising a graphical user interface in communication with the processor and configured to graphically display the workflow commands.

7. The system of claim 1, wherein the headset further comprises:
- operator device control touch controls; and
- a monocular, semi-transparent, or wearable retina image display (RID) eye-glass monitor configured to provide the operator with visual workflow instructions and supplemental visual information.

8. An operator device for interfacing an operating management system with an operator, the device comprising:
- a processor configured to execute workflow instructions wherein the process comprises
  - text to speech software;
  - speech to text software;
  - manufacturing workflow software;
  - recording and playback software;
- an acoustic transducer in communication with the processor; and
- a camera configured to capture images of at least a workflow step of the workflow instructions, and configured to send the images to the processor for archiving and perform computerized inspection;
- wherein the processor is further configured to execute commands which convert the workflow instructions from a text command into an audible command and transmit the audible command to the operator; and
- wherein the acoustic transducer is configured to receive an audible operator response and transmit the operator response to the processor for conversion to text.

9. The operator device of claim 8, wherein the operator device is configured to transmit the text over a network to a central processing unit.

10. The operator device 8, wherein the operator device comprises a headset to be worn by the operator, the headset comprising:
- a microphone configured to collect the operator response;
- a speaker configured to communicate an auditory response to the operator; and
- a wireless receiver for communicative coupling with the processor and configured to transmit the operator response to the processor either directly or through the network.

11. The operator device of claim 8, further comprising:
- operator device control touch controls; and
- a monocular, semi-transparent, wearable retina image display (RID) eye-glass monitor configured to provide the operator with visual workflow instructions and supplemental visual information.

* * * * *